United States Patent [19]

Hosie et al.

[11] Patent Number: 5,585,051
[45] Date of Patent: Dec. 17, 1996

[54] COPY SYSTEMS COMPRISING MICROENCAPSULATED COLORANTS

[75] Inventors: Lynn Hosie; Niraj Agarwal; Maria W. Sie, all of Charlotte, N.C.; David A. Whitley, Rock Hill, S.C.

[73] Assignee: Sandoz Ltd., Basel, Switzerland

[21] Appl. No.: 396,804

[22] Filed: Mar. 2, 1995

[51] Int. Cl.⁶ .............................. B01J 13/02; B01J 13/04
[52] U.S. Cl. ............................................. 264/4.1
[58] Field of Search ................................ 264/4.1

[56] References Cited

U.S. PATENT DOCUMENTS

| | | | |
|---|---|---|---|
| 3,369,900 | 2/1968 | Taylor | 264/4.1 |
| 3,645,911 | 2/1972 | van Besauw et al. | 264/4.1 |
| 4,798,741 | 1/1989 | Nelson | 427/213 |

FOREIGN PATENT DOCUMENTS 03001983  1/1991  Japan .
04114731  4/1992  Japan .

*Primary Examiner*—Nathan M. Nutter
*Attorney, Agent, or Firm*—Robert S. Honor; Carl W. Battle; Thomas C. Doyle

[57] ABSTRACT

Microcapsules containing a solution or dispersion of a colorant, especially a solution of an oil-solubilized sulfur dye, in an organic liquid having a vapor pressure below 20 mm Hg at 25° C. can be coated on a side of a sheet of paper for use in pressure-sensitive carbonless copy systems. The solutions of the oil-solubilized sulfur dyes, i.e. 1) colored products of the oxidation of a leuco sulfur dye, leuco sulfurized vat dye or reaction product of a leuco dye or sulfurized vat dye with a cationic compound and 2) colored reaction products of a solubilized sulfur dye with a cationic compound also constitute an aspect of the invention, as do microcapsules whose walls contain an opacifying agent incorporated therein.

33 Claims, No Drawings

COPY SYSTEMS COMPRISING MICROENCAPSULATED COLORANTS

This invention relates to carbonless copy systems, to coating compositions useful in producing such copy systems, to colorant-containing microcapsules for use in such coatings, to solutions of sulfur dyes which are useful in such microcapsules and to methods for producing these products.

Copy systems are known which comprise a first substrate (most commonly a sheet of paper) which is coated on one side with a coating comprising microcapsules containing a color-former component which is colorless or only lightly colored but which is capable of producing a dark color upon coming into contact with a color-developer. In use the coated substrate is subjected to the localized application of sufficient pressure to rupture the microcapsules, as from a pencil, ball point pen or typewriter type, whereby the color-former component is released from the ruptured microcapsules and comes into contact with a color-developer with which it reacts to produce a colored image corresponding to the area to which the microcapsule-rupturing pressure was applied. In the presently available copy systems of this kind the color-developer is an essential component. It may be incorporated in the same coating as the microcapsules containing the color-former component. Usually, however, it is present in a separate coating, either on the same side of the first substrate as the color-former component or on a side of a second substrate, e.g. sheet of paper, which side is in contact with the coated side of the first substrate.

Another form of copy system comprises a top sheet of paper coated on its back side with a coating composition containing carbon black and a bottom sheet of white or suitably light-colored paper whose front side is in intimate contact with the coated back side of the top sheet. When localized pressure is applied to the front side of the top sheet, as with a pencil or type, carbon black from the corresponding area of the back side of the top sheet transfers to the front side of the bottom sheet to form an image which corresponds to the area of the top sheet where the pressure was applied. Among the disadvantages of this kind of copy system are the tendency of the carbon black to smudge and to transfer during handling, thus making unwanted marks on the bottom sheet and/or the hands of the user, and the difficulty in recycling the paper due to the non-bleachability of the carbon black.

It is an object of the present invention to provide a copy system which avoids one or more of the disadvantages mentioned above. More particularly, it is an object of this invention to provide a carbonless copy system which does not comprise a color-developer and which requires that only one side of one sheet of paper be coated (although additional sheets coated on one side may be present for making multiple copies).

According to the present invention there is provided a copy system comprising a substrate having a surface which is coated with microcapsules containing an organic liquid (a), said organic liquid (a) containing a colorant.

The production of record sheets for copy systems by coating a sheet material with a microencapsulated color-former has been known in the art for over thirty years and is extensively described in the patent literature. Any sheet material known to be useful for such a record sheet, such as plastic sheet or, preferably, paper, can be employed as the substrate for a copy system according to this invention.

The coating of the substrate, i.e. sheet material with the colorant-containing microcapsules can be effected by methods known in the art, such as those described in U.S. Pat. Nos. 3,418,250; 3,418,656; 3,619,238 and 4,121,013, the disclosures of which are incorporated herein by reference. The microcapsules may be applied to the substrate in the form of a dispersion in a liquid medium which preferably contains about 30 to 50%, by weight, microcapsules and which is then allowed to dry. The liquid medium may be selected from liquids known in the art for this purpose, as illustrated in the U.S. patents cited herein, the choice of a particular liquid being influenced by the composition of the microcapsules being coated on the substrate and the particular coating method, as is well within the skill of the art. Conveniently, the liquid medium is a liquid (b) in which the microcapsules have been produced and which may have been partially removed from the microcapsules by conventional methods, such as filtration or centrifugation followed by filtration or it may be another suitable liquid in which the microcapsules are dispersed after being partially or completely separated from the liquid (b). In addition to the microcapsules, the coating composition may contain other components conventional for this purpose, such as one or more binders, e.g. methyl cellulose, hydroxyethyl cellulose, polyvinyl alcohol, starch, soy protein, casein, gelatin, gum arabic or the like, to aid in securing the microcapsules to the surface of the sheet material and/or an opacifying agent, such as titanium dioxide or other metal oxide, and/or an oxidizing agent, such as sodium bromate, for use when it is desired that oxidation of a leuco dye compound, as discussed hereinafter, take place after it has been encapsulated.

The microcapsules with which the sheet material is coated in accordance with this invention should be "pressure-sensitive" as that term is normally used in this art. By this is meant that they are rupturable by the pressure normally applied during a copy-making process using a pencil, ball point pen or typewriter. Preferably, they should be strong enough to withstand the pressure applied during normal handling prior to, during and after their application to the sheet material. More preferably, they should be of such a strength as to require a pressure of at least about 10 psi but not more than about 80 psi, preferably not more than about 50 psi, in order to be ruptured when coated on a sheet of paper.

The microcapsules should also have a particle size which will produce a suitably sharp image when the colorant-containing liquid (a) is released therefrom during a copy-making process. Preferably, at least 90%, more preferably at least 95%, most preferably substantially all of the microcapsules will have particle sizes within the range 1 to 50, especially 3 to 30, most especially 5 to 20 microns.

The microcapsules, when coated on a substrate, should preferably be capable of preventing significant evaporation of the colorant-containing liquid (a) at least until two years have passed or until they are ruptured, whichever occurs first.

Unlike the microencapsulated color-former components of previous copy systems, the colorant contained in the microcapsules of the present invention is a dye or pigment which has sufficient color to enable it, upon being released from ruptured microcapsules, to produce a distinct image against a background which is the color of the substrate on which a copy is to be made without having to first react with a color-developer. Since most copies are made on paper which is white or light colored, the dye or pigment in the microcapsules is preferably of a relatively dark shade, with blues and blacks being especially preferred.

The colorant may be dispersed or dissolved in the organic liquid (a).

Preferred colorants are dyes, especially sulfur dyes, which can be dispersed or dissolved in an organic liquid (a). More preferred are dyes which are sufficiently soluble in an organic liquid (a) to form a solution which has a color suitable for copy-making purposes. The term "sulfur dye" as used above is intended to include those dyes which are known as "Sulfur Dyes" or "Sulfurized Vat Dyes" from VENKATARAMAN "The Chemistry of Synthetic Dyes" Vol. II Chapters XXXV and XXXVI, (1952) and Vol. VII, (1974) or defined in the *Colour Index* as "Sulfur Dyes" (including colored "Leuco Sulfur Dyes") or "Solubilized Sulfur Dyes" or as "Vat Dyes" with a further indication of sulfurization in the method for their synthesis. It is also intended to include oil-solubilized sulfur dyes as described below..

Preferred dyes of the type described above are certain dyes which may be referred to generally as "oil-solubilized sulfur dyes" and which are selected from 1) the colored products of oxidizing leuco sulfur dyes, leuco sulfurized vat dyes or products (hereinafter "complexes") of reacting leuco sulfur dyes or leuco sulfurized vat dyes with cationic compounds and 2) the colored products (hereinafter "salts") of reacting solubilized sulfur dyes (i.e. water-soluble Bunte salts of sulfur dyes) with salt-forming cationionizing compounds. Representative of such dyes are the above-indicated products prepared from C.I. Sulfur Black 1 (C.I. Constitution No. 53185), C.I. Vat Black 63, C.I. Solubilized Sulfur Blue 7 (C.I. Const. No. 53441) and C.I. Solubilized Sulfur Black 2 (C.I. Const. No. 53196). However, such oil-solubilized sulfur dyes which are derived from any sulfur, sulfurized vat, leuco sulfur, leuco sulfurized vat or solubilized sulfur dye which have a color suitable for copy-making purposes are generally contemplated.

The concentration of colorant in the organic liquid (a) necessary to form a solution or dispersion which is suitable for copy-making purposes will vary from one colorant to another, but can be readily determined by a person skilled in the art for each colorant. When the colorant is a dye which is soluble in the liquid (a), the concentration of such dye in said liquid will typically range from about 0.2 to about 18%, based on the total weight of the resulting solution.

The organic liquid (a) may consist of a single organic liquid or a mixture of miscible organic liquids or it may be a combination of water and one or more organic liquids, which organic liquids are miscible with each other, provided that the proportion of water is such that said combination has the necessary characteristics and, preferably, also the preferred characteristics of a liquid (a), as set forth hereinafter. When organic liquid (a) comprises water and one or more organic liquids, the latter may be water-miscible. However, depending on how the colorant-containing solution or dispersion is produced, as discussed in greater detail below, and its degree of hydrophobicity, the organic liquid (a) may contain a small amount of water even when it comprises a water-immiscible organic liquid ($a_2$), provided that this amount of water is so small as to be inconsequential with respect to the performance of the solution or dispersion as regards this invention. The organic liquid (a) should be chemically inert with respect to the colorant which it is to contain and a non-solvent for the material which comprises the microcapsule in which it is contained (but not necessarily for the materials from which the microcapsule is produced, as discussed more fully hereinafter). It should have a viscosity which will permit it to seep freely, with the colorant dissolved or dispersed therein, from a microcapsule which has been ruptured during a copy-making process.

The organic liquid (a) should also have sufficiently low volatility that it will not undergo significant evaporation during the microencapsulation process or during normal handling and storage of the microcapsules containing such liquid prior to, during or after their application to the substrate. Preferably, it has a vapor pressure below 20 mm Hg, more preferably below 15 mm Hg, most preferably in the range 0.01 to 10 mm Hg, e.g. 0.05 to 5 mm Hg, at 25° C.

Advantageously, the organic liquid (a) also has at least one, more preferably both, of the following characteristics: freedom from color which is incompatible with the color which it is desired that the colorant impart to the copy and freedom from disagreeable odor.

The organic liquid (a) may be a water-miscible liquid ($a_1$) or water-immiscible liquid ($a_2$) in which a suitable colorant and, if necessary, a precursor of the colorant is dispersible or, preferably, soluble. By "precursor" is meant a compound which, upon becoming oxidized, will yield the colorant.

The preferred colorants being dyes, the preferred organic liquids ($a_1$) and ($a_2$) are water-miscible liquids ($a_1$') and water-immiscible liquids ($a_2$') in which such a dye is sufficiently soluble to form a solution which is useful for copy-making purposes. Preferred liquids ($a_1$') and ($a_2$') are water-miscible liquids ($a_1$") and water-immiscible liquids ($a_2$") in which the dyes identified above as the preferred dyes and, if necessary, their precursors are soluble. The term "soluble", as used herein with respect to the dyes and the organic liquids, is not intended to be limited to situations where a dye can be directly dissolved in an organic liquid (a), but also includes those situations where a dye cannot be dissolved, as such, in an organic liquid (a) but can be reduced to a form which will dissolve in the liquid (a) and will remain in solution after being reoxidized sufficiently that its color is suitable for copy-making purposes, as discussed more fully hereinafter.

Suitable water-miscible liquids ($a_1$") are glycerol, ethylene glycol, propylene glycol, diethylene glycol, triethylene glycol, polyethylene glycol of molecular weight up to about 600 and mixtures thereof with one another and/or with an amount of water such that the mixture has the characteristics of the organic liquid (a) as stated above. Especially preferred are glycerol and polyethylene glycol of molecular weight about 400 and their mixtures with water.

The preferred organic liquids (a) are the water-immiscible liquids ($a_2$), including those well known in the art for use with microencapsulated color-formers in two-component copy systems, such as animal and vegetable oils, e.g. castor oil and soybean oil; petroleum distillates and derivatives thereof, e.g. machine oil, kerosene, paraffin oil, naphthene oil etc; alkylbiphenyls, e.g. monoisopropylbiphenyl (MIBP), diisopropylbiphenyl and monoisobutylbiphenyl; chlorinated biphenyls; alkylterphenyls; alkylnaphthalenes; diallyl ethane; diphenylalkanes; triisopropyltoluene; xylene; chlorinated paraffins and mixtures thereof, especially liquids ($a_2$') which are a solvent for a dye.

Most preferably, the organic liquid (a) is a liquid ($a_2$") as described above, which may be a liquid ($a_2"_a$), in which a leuco sulfur dye or a leuco sulfurized vat dye can be dissolved and will remain dissolved after becoming oxidized to a sufficient extent to give it a color suitable for copy-making purposes, or a liquid ($a_2"_b$), which is a solvent for one or more colored complexes of a leuco sulfur dye or leuco sulfurized vat dye with a cationizing compound or for one or more salts of a solubilized sulfur dye with a cationic compound.

Representative liquids ($a_2"_a$) are alkoxylated alcohols, e.g. $C_{9-15}$ linear primary alcohols ethoxylated with 1 to about 8, preferably 1 to 4, moles of ethylene oxide per mole of alcohol; sorbitan esters, e.g. mono-, di- and triesters of sorbitol with $C_{14-20}$, especially $C_{18}$, carboxylic acids; alkoxylated alkylphenols, e.g. mono-, di- and tri-($C_{6-12}$, particularly $C_9$ alkyl)phenols ethoxylated with 3 to 7 moles of ethylene oxide; polypropylene glycols of molecular weight in the range 1200 to 4000; polyoxypropylene-polyoxyethylene block copolymers; and mixtures of vegetable oils with modified triglycerides. Representative examples of such solvents are mixed $C_{9-11}$ alcohols containing 2.5 ethylene oxide (EO) groups (NEODOL 91-2.5), $C_{11}$ alcohol containing 3 EO groups (NEODOL 1-3), mixed $C_{12-13}$ alcohols containing 1 or 3 EO groups (NEODOL 23-1 or 23-3) and mixed $C_{12-15}$ alcohols containing 3 EO groups (Neodol 25-3) (the numbers of EO groups each being the average number of moles of ethylene oxide per mol of linear primary alcohol); sorbitan trioleate (SPAN 85); nonylphenol ethoxylated with an average of 4 moles of ethylene oxide (TERGITOL NP-4); polypropylene oxide-polyethylene oxide block copolymers of molecular weight 2000 (PLURONIC L-61); soybean oil in admixture with a modified triglyceride, such as coconut oil modified with 10%, by weight, tetrakis [methylene (3,5-di-tert.-butyl-4-hydroxyhydrocinnamate)] methane (CAPLUBE C4000 from Karlshamns); and polypropylene glycol of molecular weight 1200. "NEODOL", "SPAN" and "TERGITOL" are registered U.S. trademarks.

Representative liquids $(a_2"_b)$ are alkylbiphenyls containing 1 to 2 $C_{3-4}$ alkyl groups, such as monoisopropylbiphenyl (MIBP), monoisobutylbiphenyl and diisopropylbiphenyl; partially hydrogenated terphenyls and mixtures of these with up to 50%, based on the total weight, of unsubstituted or substituted naphthalene, such as alkylnaphthalenes containing 1 or 2 $C_{3-4}$ alkyl groups, e.g. 2,6-diisopropylnaphthalene; partially hydrogenated terphenyls containing partially hydrogenated quaterphenyls (HB-40 from Monsanto); mixtures of monoisopropylbiphenyl with HB-40 and mixtures of monoisopropylbiphenyl or HB-40 with up to 50%, based on total weight, of one or more alkylnaphthalenes.

Microencapsulation of a water-miscible organic liquid $(a_1)$ containing a dispersed or dissolved colorant can be effected by an interfacial crosslinking method which comprises i) emulsifying the water-miscible organic liquid $(a_1)$, which contains either the colorant or a precursor of the colorant, in a liquid (b), which is (b 1) which is immiscible with the liquid $(a_1)$, to form an emulsion comprising droplets of the colorant-containing or colorant precursor-containing liquid $(a_1)$ as the discontinuous phase in the liquid $(b_1)$ as the continuous phase, said liquid $(a_1)$ further containing either a crosslinking agent or a polymeric material which is capable of undergoing a crosslinking reaction with said crosslinking agent to form a crosslinked polymeric material which is insoluble in said liquids $(a_1)$ and $(b_1)$, and ii) subjecting said emulsion to conditions whereby said crosslinking reaction takes place at the interface between the two said liquids, thereby producing said crosslinked polymeric material in the form of microcapsules, each enveloping a droplet of the water-miscible organic liquid $(a_1)$, said method being characterized in that whichever of the crosslinking agent and the cross-linkable polymeric material is not present in liquid $(a_1)$ during step (i) is present in liquid $(b_1)$ during step (ii) as a result of being introduced into said liquid $(b_1)$ prior to or during step (ii) and further characterized in that step (i) is carried out under such conditions and with a sufficient amount of emulsifying agent, if needed, that the droplets of the liquid $(a_1)$ are of such size that the microcapsules formed around them will have the particle sizes disclosed above.

The pH of the colorant- or colorant precursor-containing water-miscible organic liquid $(a_1)$ (including the water-containing mixtures mentioned above) may be in the range 2 to 13, preferably 4 to 11. The optimum pH will depend on the particular crosslinking agent or crosslinkable polymeric material contained therein and is within the skill of the art to determine without undue experimentation.

The liquid $(b_1)$, besides being immiscible with the liquid $(a_1)$, must also be one in which said liquid $(a_1)$ is emulsifiable, either per se or in the presence of a suitable emulsifying agent. It may comprise any such liquid or mixture thereof which is a suitable solvent, as discussed below, for the crosslinking agent or crosslinkable polymeric material which it is to contain but a non-solvent for the crosslinked polymeric material produced in step (ii). Preferably, it should have a boiling point which is above the temperature at which the crosslinking reaction is to be effected and be capable of extracting no more than a tolerable amount of, more preferably not any, colorant or colorant precursor from the water-miscible organic liquid $(a_1)$ during the encapsulation procedure. If subsequent separation is to be carried out, the liquid $(b_1)$ should be separable from the crosslinked polymeric material to the desired extent by means which will not adversely affect the microcapsules. To the extent that it is not separated, it should be a suitable medium for coating the microcapsules onto the sheet material of the copy system.

Representative of liquids which are suitable as liquids $(b_1)$ for the above-described interfacial crosslinking method are natural oils, such as animal and vegetable oils, e.g. soybean oil or castor oil; petroleum distillates and derivatives thereof, such as machine oil, kerosene, paraffin oil, naphthene oil etc.; alkylbiphenyls, such as monoisopropylbiphenyl, diisopropylbiphenyl and monoisobutylbiphenyl; chlorinated biphenyls; alkylterphenyls; hydrogenated terphenyls; alkylnaphthalenes; diallyl ethane; triallyl ethane; diphenylalkanes; alkylphthalates; benzene; toluene; triisopropyltoluene; xylene; chlorinated paraffins and mixtures thereof. Preferred liquids $(b_1)$ are toluene, vegetable oils, particularly soybean oil, and alkylbiphenyls, particularly monoisopropyl- and monoisobutylbiphenyl.

The selection of appropriate reactants, i.e. crosslinking agents and crosslinkable polymeric materials, for making the microcapsules by interfacial crosslinking is within the ordinary skill of the art, as are the techniques for controlling the degree of crosslinking to obtain the desired hardness and barrier properties, e.g. by selecting a crosslinkable polymeric material having a suitable proportion of crosslinkable sites and by employing appropriate amounts of reactants and appropriate reaction conditions.

Each reactant should be sufficiently soluble in the particular liquid $(a_1)$ or $(b_1)$ in which it is to be present and under the reaction conditions which are to be used during step (ii) as to enable the crosslinking reaction to proceed. Preferably, each reactant is completely soluble in said particular liquid in the amount employed and at the temperatures at which the crosslinking reaction takes place. More preferably, it is also soluble in said particular liquid in the amount employed and at the temperature of the liquid when it introduced therein or at least when the emulsification is effected. Preferably, the crosslinking agent is insoluble in the liquid in which the crosslinkable polymeric material is present during the microcapsule-forming procedure and the crosslinkable polymeric material is insoluble in the liquid in which the crosslinking agent is present.

It is within the ability of a person of ordinary skill in the art to select an effective crosslinking agent for a particular polymeric material from among the many which are known in the art. Crosslinking agents which are soluble in one or more water-miscible organic liquids $(a_1)$ include zirconium complexes, such as zirconium potassium carbonate and zirconium ammonium carbonate; zirconium chloride; boric acid; and borates, such as sodium borate. Crosslinking agents which are soluble in one or more liquids $(b_1)$ include acid dichlorides, such as succinyl chloride and adipoyl chloride; titanium complexes, e.g. tetraisopropoxy titanate; dicarboxylic acid anhydrides, such as phthalic anhydride; aliphatic polyisocyanates, such as 1-pentyl-2-heptyl-3,4-bis-(9-isocyanatononyl)-cyclohexane; and aromatic polyisocyanates, such as homopolymers of toluene diisocyanate.

The term "soluble", as applied to any reagent in the last two preceding paragraphs, and particularly as applied to a crosslinkable polymeric material which is to be present in the liquid ($a_1$), is intended to include those situations where the reagent is capable of dissolving in the appropriate liquid under the conditions which are to be used for the crosslinking reaction as well as those situations where the reagent, particularly a crosslinkable polymeric material, such as gelatin, may not dissolve in the respective liquid under the conditions to be used for the crosslinking reaction, but will dissolve under different conditions, such as at a higher temperature, and then remain dissolved when the conditions are changed to those which are to be used for the crosslinking reaction.

Representative crosslinkable polymeric materials which are soluble in one or more suitable liquids ($a_1$) are gelatin, particularly gelatin of 175 to 300 Bloom; carboxymethyl cellulose; polyvinyl alcohol; polysaccharides, such as agar and natural and modified starches; gum arabic and sodium alginate. Representative crosslinkable polymeric materials soluble in one or more suitable liquids ($b_1$) are polymers containing multiple hydroxy, carboxy, ester and/or amino groups, including polyvinyl acetate, cationic poly(aminosilicones), cellulose acetate butyrate, styrene-allylic alcohol copolymers, ethylene-vinyl acetate copolymers and acrylic polymers, such as poly(methylmethacrylate).

It is often advantageous to employ an emulsifying agent in step (i). Preferably, it is one which, in the amounts used and under the conditions employed to form the emulsion, will not cause a significant quantity of the colorant or colorant-precursor to be extracted from the liquid ($a_1$). The emulsifying agent may be anionic, amphoteric or, preferably, cationic or non-ionic. Preferably, it has an HLB-value no higher than about 8, more preferably in the range 1 to 6, especially 1.5 to 3.5. Emulsifying agents which come to mind are ethoxylated $C_{9-15}$ alcohols, such as TERGITOL TMN-3, Neodol 25-3 and NEODOL 91-2.5; phospholipids, such as CENTROPHASE C (from Central Soya); ethoxylated nonylphenols, such as TERGITOL NP-4; polyoxyethylene (4) lauryl ether; polyoxyethylene (2) oleyl ether; modified triglycerides, such as CAPLUBE C4000 from Karlshamns, which is coconut oil modified with 10%, by weight, tetrakis[methylene (3,5-di-tert.butyl-4-hydroxy-hydrocinnamate] methane; sorbitan esters, such as sorbitan monolaurate and sorbitan trioleate; and cationic silanes, such as CXS-1071, a polymeric quaternary fatty amidoamino silicone obtained from Karlshamns. "CENTROPHASE" is a registered U.S. trademark.

The colorant-containing or colorant precursor-containing water-miscible organic liquid ($a_1$) and the liquid ($b_1$) are used in amounts effective to produce an emulsion in which the former constitutes the discontinuous phase and the latter the continuous phase, preferably in a ratio ($a_1$):($b_1$) in the range 4:96 to 45:55, more preferably 6:94 to 20:80, based on total parts by volume.

Enough crosslinkable polymeric material should be used to produce sufficient crosslinked polymeric material to encapsulate substantially all the droplets of liquid ($a_1$). When the crosslinkable polymeric material is to be present in liquid ($a_1$), it is suitably employed in amounts in the range 1 to 30%, preferably 1 to 12%, more preferably 3 to 6% by weight, based on the weight of said liquid. When the crosslinkable polymeric material is one which is to be dissolved in the liquid ($b_1$), it is suitably employed in an amount in the range 0.1 to 10 grams, preferably 0.5 to 6 grams, more preferably 0.6 to 3.8 grams, per 100 ml. of liquid ($b_1$).

The amount of crosslinking agent will vary, depending, for example, on the number and nature of crosslinkable sites in the polymeric material, and will generally be such that the weight ratio of the crosslinking agent to the polymeric material is in the range 4:1 to 1:20, preferably 4:1 to 1:7 when the crosslinking agent is present in the liquid ($b_1$) and preferably 1:2 to 1:15 when it is present in the water-miscible organic liquid ($a_1$).

The amount of emulsifying agent, if used, will vary depending on such factors as the properties of the particular emulsifying agent, the amount of shear imparted by the emulsifying apparatus, the duration of the emulsification step and the desired particle size of the discontinuous phase and is within the ordinary skill of the art to determine. Amounts in the range 0.05 to 10 grams per 100 ml, of liquid ($b_1$) have yielded good emulsions. If an emulsifying agent is used, it is preferably added to the liquid ($b_1$) before said liquid is combined with the liquid ($a_1$).

The emulsification can be effected in known manner using conventional equipment, such as a high shear homogenizer, such as the IKA T50 Ultra Turrax homogenizer from Jahnke and Kunkel. The emulsification is continued until the desired droplet size of the discontinuous phase has been achieved, preferably until at least 90%, more preferably at least 95%, most preferably substantially all of the droplets are of such a size that the subsequent interfacial crosslinking reaction will result in the formation of microcapsules having the particle sizes described above. The amount of time required to achieve the desired droplet size will depend on the particular liquids, the magnitude of the shear, and the amount and nature of any emulsifying agent used.

When the crosslinking agent and the crosslinkable polymeric material are not both present during step (i) and said polymeric material is not gelatin, step (i) can be carried out over a wide range of temperatures, e.g. from 10° to 90°, preferably 20° to 75° C., more preferably around room temperature.

When both reactants are present during step (i), each is preferably added to its respective liquid before the liquids are mixed together. Preferably, the mixture of liquids is emulsified under conditions which will produce the desired droplet size before crosslinking and/or gelation takes place to such an extent as to significantly interfere with the emulsification.

The particular method whereby the crosslinkable polymeric material is introduced into the liquid ($a_1$) is not critical. It may be added to said liquid at a temperature at which it is soluble or insoluble therein. In the latter situation the resulting mixture may be heated to dissolve the polymeric material in the liquid ($a_1$) during or, preferably, prior to the emulsification. Furthermore, it may be added to the total of the liquid ($a_1$) or it may be dissolved in a portion of said liquid and the resulting solution then mixed with the remaining portion of said liquid. For example, gelatin may be dissolved in water at elevated temperature, e.g. 35° to 55° C. and the resulting solution then mixed with glycerol at the same temperature or at room temperature.

When the crosslinkable polymeric material is gelatin, a solution thereof in the water-miscible organic liquid ($a_1$), once formed, is preferably maintained under conditions, particularly temperature conditions (e.g. 35° to 55° C.), to prevent gelation from occurring before the emulsification is completed.

When the crosslinking agent is present in the liquid $(b_1)$ during step (i), the emulsification may advantageously be effected using emulsifying means which impart a high enough degree of shear, so that the desired droplet size is achieved before premature crosslinking and/or gelation occurs. Preferably, the temperature is in the range 20° to 55° C., with temperatures at the higher end of this range being particularly preferred when the crosslinkable polymeric material is gelatin and temperatures in the lower end of the range being more preferred when the polymeric material is neither gelatin nor a material with similar gelling properties.

When the crosslinking agent is added to the liquid $(b_1)$ between steps (i) and (ii) and/or during step (ii), step (i) is preferably carried out with less than the total amount of liquid $(b_1)$ which is to be employed in making the microcapsules, e.g. about 65 to 95%, by volume, of said total amount, and the remainder, with the crosslinking agent preferably dissolved therein, is added to the continuous phase of the already-formed emulsion.

When the crosslinkable polymeric material is present in the liquid $(b_1)$ during step (i), this step is preferably carried out at a temperature below 45° C., particularly in the range 20° to 30° C. and with sufficient shear to effect emulsification before premature crosslinking takes place.

When the crosslinkable polymeric material is added to the liquid $(b_1)$ between steps (i) and (ii) and/or during step (ii), step (i) is preferably carried out with less than the total amount of the liquid $(b_1)$ which is to be employed, e.g. about 50 to 80%, by volume, of said total amount and the remainder, with the crosslinkable polymeric material preferably dissolved therein, is added to the continuous phase of the already-formed emulsion.

In step (ii) of the interfacial crosslinking process the emulsion from step (i) is adjusted to a temperature suitable for the crosslinking reaction to proceed, preferably in the range 4° to 90° C., for a sufficient time for a microcapsule-forming-effective amount of crosslinking to take place, e.g. about 3 to 18 hours. When the crosslinkable polymeric material is gelatin or a material have similar gelling properties, the emulsion is preferably cooled to a temperature at which gelling will take place, e.g. 5° to 20° C. and stirred at that temperature until the desired microcapsules have been formed. When the crosslinking agent is in the water-miscible organic liquid $(a_1)$, the crosslinking is preferably effected at 30° to 90°, more preferably 45° to 70° C., for a preferred time of about 5 to 8 hours. When one of the reactants is added to the liquid $(b_1)$ during step (ii), it is preferably added gradually to the emulsion, which is at the crosslinking temperature.

Microcapsules of this invention which contain the colorant or colorant precursor dispersed or, preferably, dissolved in a water-immiscible organic liquid $(a_2)$ can be prepared by methods well-known in the art, i.e. by those methods known for microencapsulating solutions of known color-formers, such as crystal violet lactone, for use in pressure-sensitive copy systems. Such methods, as well as additional water-immiscible liquids suitable as liquid $(a_2)$ and capsule-forming materials which are useful for the present invention, are disclosed, for example, in U.S. Pat. Nos. 2,730,457; 2,800,457; 3,016,308; 3,137,631; 3,201,353; 3,418,250; 3,418,656; 3,578,605; 3,712,507; 3,875,074; 3,886,084; 3,993,831; 4,082,688; 4,250,098; 4,397,483; 4,586,060; 4,808,408; 4,822,416; 4,882,770 and 5,023,024 and Reissue U.S. Pat. No. 24,899, the disclosures of which are incorporated herein by reference.

The preferred methods for microencapsulating the colorant- or colorant precursor-containing liquid $(a_2)$ comprise forming an emulsion of said liquid $(a_2)$ as the discontinuous phase in a liquid (b) as the continuous phase, where the liquid (b) is a liquid $(b_2)$ which is immiscible with the liquid $(a_2)$ and is preferably water.

Among the suitable microencapsulation methods is coacervation, such as disclosed in the aforementioned U.S. Pat. Nos. 2,730,457; 2,800,457 and 3,201,353 and Reissue U.S. Pat. No. 24,899.

Simple coacervation may be achieved by forming an emulsion comprising a dispersion or solution of the colorant or colorant precursor in a water-immiscible liquid $(a_2)$ as the discontinuous phase in an aqueous solution of a hydrophilic colloid material as the continuous phase, at a temperature at which the colloid material remains in the dissolved state without undergoing a chemical change which would render it unsuitable for making the microcapsules. For the preferred colloid material, gelatin, which is preferably 175–300 Bloom, such temperature is above the gelation point, preferably in the range 40° to 55° C. Emulsification is continued until the droplets of the discontinuous phase are of the appropriate size for formation of the desired size microcapsules and a salt, such as sodium sulfate, is added to induce coacervation of the colloid material and resultant formation of a film around the individual droplets. The resultant mixture is allowed to cool and the film is hardened by addition of an effective amount of a hardening agent, such as formaldehyde or glutaraldehyde.

Complex coacervation can be effected by a process wherein a dispersion or solution of the colorant or colorant precursor in a liquid $(a_2)$ is emulsified in water into which there are dissolved two colloid materials having opposite charges, such as gelatin and gum arabic. Coacervation of the aqueous colloid solution around the droplets of the liquid $(a_2)$ containing the colorant or colorant precursor is effected by addition of water and adjustment of the pH to the acidic range, e.g. 3.5 to 5.5, and the coacervate around each droplet is gelled by cooling and hardened by the addition of glutaraldehyde or other hardening agent suitable for the particular system being used, as disclosed in U.S. Pat. No. 2,800,457.

According to a particularly suitable complex coacervation method, one part, by volume, of a dispersion or solution of the colorant or colorant precursor in a liquid $(a_2)$ is added to about two to five parts, by volume, of an aqueous solution having a pH of at least about 5, preferably about 5 to 8, and a temperature of about 40° to 60°, preferably 45° to 55° C., and containing gelatin and gum arabic in amounts which are substantially equal, by weight, and sufficient to encapsulate the colorant- or colorant precursor-containing liquid $(a_2)$ after it has been converted to droplets of the desired particle size. Preferably, the amounts of gelatin and gum arabic in the aqueous solution are each about 2.5 to about 5.0%, by weight, based on the weight of the water. Preferably, such a mixture is prepared by mixing about one to two parts, by volume, of an 8 to 12%, by weight, aqueous gelatin solution with an equal amount of an 8 to 12% aqueous gum arabic solution and about 0.5 to 1.5, preferably 1, part additional water, each preheated to a temperature within the aforementioned ranges, adjusting the pH with a suitable base, such as aqueous alkali metal hydroxide, and adding the colorant- or colorant precursor-containing liquid $(a_2)$ to the resulting mixture at about 50° C. The resulting mixture is emulsified at 45°–55°, preferably 50° C., until the desired particle size of the droplets of liquid $(a_2)$ is achieved and then maintained at that temperature with stirring while about 4 to 6 parts of water at approximately the same temperature are added thereto. The pH of the resulting mixture is lowered to about 4.0 to 6.5 with a suitable acid, such as glacial acetic acid, (more preferably, about 4.5 to 5 when a liquid ($a_2''_a$) is employed and about 5 to 6 when a liquid ($a_2''_b$) is used) and it is then gradually cooled, preferably over a period of about 2 to 4 hours, to a temperature of about 18° to 25° C., preferably room temperature, and stirred at that temperature for about 12 to 20 hours, preferably about 15 to 17 hours. The mixture is then cooled to about 10° to 16° C. and an aqueous solution of an effective amount of a suitable crosslinking agent, for example 0.1 to 0.5 part, by volume, of a 6 to 25% solution of glutaric dialdehyde, is added thereto and the resulting mixture is maintained at 10° to 16° C. for about an hour and then allowed to warm to room temperature over a period of about 4 to 6 hours.

The water added between the emulsification step and the pH-lowering step of the last-described procedure may contain polyethylene glycol, such as PEG 10000, in accordance with the teaching of H. Jizomoto, J. Pharmaceutical Sciences, vol. 73, #7, 1984, pp. 879–882, to allow for a wider pH range for coacervation to take place. If this is done, it may be advantageous to raise the pH of the mixture to about 8 just prior to the addition of this PEG-containing solution to assure that agglomeration does not occur.

A modified complex coacervation method is disclosed in Examples II–V of the aforementioned U.S. Pat. No. 4,822,770.

U.S. Pat. No. 3,886,084 discloses a method of interfacial crosslinking which differs from the interfacial crosslinking method described above in several respects, particularly in that the discontinuous phase of the emulsion comprises a water-immiscible liquid and the continuous phase is an aqueous solution.

Suitable methods for producing multiwalled microcapsules containing the colorant or colorant precursor dispersed or dissolved in a water-immiscible liquid ($a_2$) are disclosed in aforementioned U.S. Pat. No. 4,586,060.

The walls of the microcapsules may be transparent so that their color corresponds essentially to the colorant which they contain or they may be lighter colored or white due to the presence of opacifiers. As indicated above, an opacifying agent may be added to the liquid medium in which the microcapsules are coated on the substrate of the copy system. Another method of introducing the opacifier is to add it during the microencapsulation process, preferably after the capsule-forming material has enveloped the droplets of the organic liquid (a) but prior to crosslinking. This can be done by preparing an aqueous dispersion containing about 15 to 35% opacifier, such as a metal oxide, 0.5 to 3% gelatin (Bloom 275) and preferably an effective amount of a nonionic surfactant to prevent agglomeration and adding this well-stirred dispersion in an amount of about 20 to 30%, by weight, to the dispersion of encapsulated droplets of the organic liquid (a), preferably prior to the addition of the crosslinking agent.

A great number of suitable solutions and dispersions of colorants and colorant precursors in organic liquids (a) can be prepared by conventional methods well known in the art, such as those described in the patents mentioned above.

A dispersion of a colorant in an organic liquid (a) in which it is not soluble can be prepared by milling a mixture of the colorant and the liquid, optionally with a suitable dispersing agent, until the colorant particles are of a suitable size, e.g. 0.05 to 3 microns, and then adding more of the liquid, as necessary, to achieve a concentration which gives suitable flow properties and color depth for copy-making purposes.

Another technique is to add to a solution of a dye in a first organic liquid (a) a second organic liquid (a), which is miscible with the first liquid (a) but which is a non-solvent for the dye, in an amount sufficient to effect precipitation of the dye in the resulting liquid mixture. A third method is to mix solid leuco sulfur dye particles, prepared as described hereinafter, with an organic liquid in which the particles are not soluble, followed by oxidation of the leuco dye particles. Methods can also be used which are analogous to those described in U.S. Pat. No. 5,178,949, the disclosure of which is incorporated herein by reference.

In the disclosure which follows methods are described for making solutions of oil-solubilized sulfur dyes in organic liquids (a) and for making particles, dispersions and solutions of corresponding leuco sulfur dyes and leuco sulfur dye complexes which are useful as intermediates for making the oil-solubilized sulfur dye solutions. It is to be understood that analogous methods can be used for making such solutions from sulfurized vat dyes and for making the corresponding leuco sulfurized vat dye intermediates.

In the following description, where mention is made of oxidation of a leuco sulfur dye compound after it has become dissolved in a liquid ($a_1''$) or ($a_2''$), the oxidation should proceed until the dye solution has a color which is suitable for copy-making purposes. More preferably, the oxidation proceeds until there is no further increase in the color strength of the solution. Conveniently, if the starting material for making the oil-solubilized sulfur dye is a commercially available sulfur dye, sulfurized vat dye or corresponding leuco dye and has a specified color strength, the oil-solubilized dye made therefrom may be allowed to become oxidized to said specified color strength as may be determined spectrophotometrically by reflectance or transmittance measurement using methods known to those skilled in the art. Oxidation of the leuco sulfur dye dissolved in the liquid ($a_1''$) or ($a_2''$) can be effected by exposing the solution to air for a sufficient period of time to effect the desired color development, which period of time can be shortened by the use of a more concentrated source of oxygen and/or elevated temperatures, e.g. 40° to 60° C., and/or agitation, such as stirring,. The oxidation is preferably terminated before any precipitation of dye occurs, more preferably as soon as the desired color strength, advantageously the full color strength, has been developed. It is preferred to oxidize the leuco dye or leuco dye complex before encapsulating the liquid ($a_1''$) or ($a_2''$) in which it is dissolved. However, it is possible, if the walls of the microcapsules are sufficiently oxygen-permeable (as may be achieved by appropriate selection of microencapsulation materials and conditions, as is within the skill of the art), to effect a suitable degree of oxidation after the solution has been encapsulated. With products produced in this last-mentioned manner precipitation as a result of further oxidation during storage has not been observed.

A solution of an oil-solubilized sulfur dye in a water-miscible organic liquid ($a_1''$) can be produced by oxidation of a leuco sulfur dye which has been dissolved in a liquid ($a_1''$). One suitable procedure comprises adding a liquid ($a_1''$), which is a solvent for a leuco sulfur dye and is preferably water-free, to an aqueous solution of the leuco dye in an amount such that the resulting mixture has the characteristics of an organic liquid (a) as described above and subsequently oxidizing the leuco dye. Another procedure comprises mixing a liquid ($a_1''$) with an aqueous dispersion of solid particles of a leuco sulfur dye, preferably a dispersion containing a high enough concentration of the leuco dye that the resulting solution, after sufficient oxidation of the dissolved leuco dye, will have a color suitable for copy-making purposes. Preferably, the mixing is done at a temperature in the range of about 20° to 65° C. The liquid ($a_1''$) should be added to the aqueous dispersion in an amount such that the resulting mixture of the liquid ($a_1''$) and water has the characteristics of a liquid (a) as described above and dissolves the dispersed leuco dye. When the liquid ($a_1''$) is glycerol, solid particles of C.I Leuco Sulfur Blue 7, C.I. Leuco Sulfur Black 1 and C.I. Leuco Vat Black 63 become dissolved when the glycerol content of the glycerol-water mixture is at least 77%, at least 77% and at least 73%, respectively, by weight.

A solution of an oil-solubilized sulfur dye in a water-immiscible organic liquid ($a_2''_a$) can be prepared by oxidizing a leuco sulfur dye which has been dissolved in a liquid ($a_2''_a$). One effective procedure comprises emulsifying an aqueous dispersion of a leuco sulfur dye and a liquid ($a_2''_a$) which is a solvent for the leuco dye and stirring the emulsion at elevated temperature, e.g. about 30° to 50° C. for a long enough time for a desired amount of the leuco dye to be extracted from the aqueous phase and become dissolved in the liquid ($a_2''_a$). The emulsion is then allowed to separate and the leuco dye-containing liquid ($a_2''_a$) is decanted off and the leuco dye is oxidized. Solutions having dye concentrations as high as 18%, by weight, can be prepared in this manner, with solutions containing about 0.2 to 10% dye being preferred. Preferably, the emulsion is prepared using about 0.3 to 4 parts of the liquid ($a_2''_a$) per part of the aqueous dispersion, by volume.

Similar solutions can be prepared by dissolution of solid leuco sulfur dye particles in a suitable liquid ($a_2''_a$) and oxidation of the leuco dye.

Solid leuco sulfur dye particles can be produced by drying an aqueous dispersion of such particles. Preferably, the bulk of the water is separated from the particles by filtration or decantation optionally preceded by centrifugation and the remainder by drying, e.g. at a temperature of about 25° to 60° C. at 25–760 mm Hg. The undried particles from which the bulk of the water has been removed can also be used to prepare a solution of the leuco dye in a liquid ($a_2''_a$) by extraction, as described above. Preferably, the solid leuco dye particles are kept under an inert atmosphere until they become dissolved in the liquid ($a_2''_a$).

An aqueous dispersion of solid leuco sulfur dye particles can be prepared by lowering the pH of an aqueous leuco sulfur dye solution by a sufficient magnitude to effect precipitation of the leuco dye. Preferably, the pH is lowered to within the range 1.5 to 8.0, more preferably 2.0 to 7.5, by addition of an organic or inorganic acid, such as acetic, formic, carbonic, sulfuric or hydrochloric acid. The acid is preferably added to the solution with stirring at a temperature of about 20° to 50° C. and, more preferably, under a inert atmosphere.

A solution of a colored complex of a leuco sulfur dye in a liquid ($a_2''_b$) can be prepared by dissolving in said liquid a leuco sulfur dye complex which is soluble therein and, where necessary, oxidizing the dissolved complex. The leuco dye complex can be preformed as solid particles and then dissolved by simply mixing the particles with the liquid ($a_2''_b$) or by extracting them from an aqueous dispersion into the liquid ($a_2''_b$), or acid-precipitated leuco sulfur dye particles, as such or in an aqueous dispersion, can be mixed with a liquid ($a_2''_b$) containing a complex-forming cationizing compound to effect formation of a solution of an ($a_2''_b$)-soluble leuco dye complex. Preferably, these procedures are carried out in an inert atmosphere, e.g. under a nitrogen blanket.

The preformed complexes of leuco sulfur dyes (or leuco sulfurized vat dyes) referred to above can be prepared in the manner disclosed in U.S. Pat. No. 5,300,148, the entire disclosure of which (including the list of dyes from column 2 as illustrative of additional dyes which can be used as intermediates in accordance with the present invention) is incorporated herein by reference. As disclosed in said patent, the leuco dye complex (the "desolubilized product" of the patent) can be prepared by reacting the cationizing complex-forming agent which is suitable for the introduction of at least one water-desolubilizing cation with a form of the leuco dye which has sufficient color for pigmenting purposes so as to introduce one or more water-desolubilizing cations into the molecule. However, it is preferred, for purposes of the present invention, to employ a leuco sulfur dye or leuco sulfurized vat dye which is in such a reduced state that its aqueous solution is colorless to amber colored, more preferably yellowish to amber colored, and subsequently oxidize the leuco dye complex produced therefrom to a sufficiently colored state for copy-making purposes. Also, when employing a cationizing compound as described in the patent (preferably a compound of formula (III) or protonated acid addition product thereof or, especially, formula (IV) defined therein), such a compound must be selected as will react with the leuco sulfur dye to produce a complex which is soluble in a liquid ($a_2''_b$) in an amount sufficient for copy-making purposes in accordance with this invention. Preferably, the cationizing compound will, itself, be soluble in the liquid ($a_2''_b$).

Other similar amines and quaternary ammonium compounds outside the scope of said formulae (III) and (IV) of U.S. Pat. No. 5,300,148 can be used in the same manner, so that the following expanded formulae (III') and (IV') are used to define preferred cationizing compounds for use in accordance with the present invention:

(III')

or

(IV')

wherein

R signifies an aliphatic hydrocarbon radical with 8–24 carbon atoms, $R_1$ signifies $C_{1-4}$ alkyl, $R_2$ signifies $C_{1-24}$ alkyl, $C_{3-24}$ alkenyl or benzyl, $R_3$ signifies $C_{1-4}$ alkyl and $Z^-$ signifies an anion, provided that for each compound the specific significances of R, $R_1$, $R_2$ and $R_3$ are such that the compound will form with a leuco sulfur dye a reaction product which is soluble in a liquid ($a_2''_b$). More preferably, the specific significances of R, $R_1$, $R_2$ and $R_3$ are such that the compound itself is soluble in a liquid ($a_2''_b$).

Suitable compounds of formula (IV') are N,N,N-trimethyl-N-nonyl ammonium bromide, N,N-dicetyl-N,N-dimethylammonium chloride and N,N-dicoco-N,N-dimethylammonium chloride.

Other suitable cationic compounds include cationic aminosilicones, such as CXS-1071, described above.

A preferred procedure is to form the leuco dye complex in the liquid ($a_2''_b$) by mixing solid particles of the leuco sulfur dye or leuco sulfurized vat dye with a liquid ($a_2''_b$) which contains enough of the cationic compound, as described above, to form with the leuco dye a sufficient amount of soluble complex to give a solution suitable for copy-making purposes. This may be done either by mixing the cationizing compound-containing liquid ($a_2''_b$) with the leuco dye particles, per se, or by mixing said cationizing compound-containing liquid with an aqueous dispersion of said particles to extract said particles from the aqueous phase into the organic liquid where they react with the cationizing compound to form an ($a_2''_b$)-soluble complex. These procedures are preferably carried out at temperatures in the range 25° to 90° C., more preferably 40° to 65° C., and in an inert atmosphere for a sufficient time for a solution of the desired dye complex to be produced. At that point the solution may be removed from the inert atmosphere and oxidation of the dissolved leuco dye complex allowed to occur to an extent sufficient to produce a depth of color suitable for copy-making purposes. Particularly good results have been obtained according to this method when the leuco dye particles have been produced by lowering the pH of an aqueous leuco sulfur dye solution to about 4 under nitrogen, usually resulting in the formation of a yellow to green precipitate.

An aqueous leuco sulfur dye solution for use as described above to produce leuco sulfur dye particles or to produce an ($a_2''_b$)-soluble complex of a leuco sulfur dye can be prepared by further reducing and/or diluting, as necessary, a commercially available prereduced sulfur dye liquid, such as those sold under the registered U.S. trademarks SODYESUL and SANDOZOL by Sandoz Clariant Corporation, or a leuco sulfur dye reaction mass obtained from a conventional thionation reaction for the production of a sulfur dye. It may also be prepared by methods well known in the art for reducing a corresponding sulfur dye with a reducing agent in an aqueous alkaline medium. In this regard, the disclosure of U.S. Pat. No. 4,917,706 is incorporated herein by reference.

As reducing agents for producing a leuco sulfur dye solution are generally contemplated those compounds known in the art for this purpose, such as thiourea dioxide, sodium hydrosulfite, sodium borohydride, sodium formaldehyde sulfoxylate, potassium-sodium tartrate, mercaptans, such as mercaptoacetic acid, sodium sulfide and reducing carbonyl compounds, such as aliphatic carbonyl compounds containing, as a substituent in the alpha-position to the carbonyl group, a hydroxy or alkoxy group or an amino group which may be acetylated, e.g. glucose or hydroxy acetone. A preferred reducing agent is thiourea dioxide.

The reducing medium may be rendered alkaline with a wide variety of compounds known for this purpose, in particular a hydroxide or carbonate of an alkali metal such as sodium or potassium.

The amounts of sulfur dye, alkali and reducing used to produce the aqueous leuco sulfur dye solution may vary depending on the particular compounds used but are within the skill of the art to determine without undue experimentation. Good results have been achieved using about 0.4 to 20, preferably 0.5 to 5, parts of sulfur dye per 100 parts of water, about 0.5 to 25 parts of reducing agent per part of sulfur dye and sufficient alkali to give the aqueous medium a pH above 10, preferably at least about 11.5, more preferably about 13 to 13.5. Using reduction potential as a guide, good results have been obtained when the amounts of alkali and reducing have been such as to give a leuco sulfur dye solution having a reduction potential in the range −120 to −700 mV, preferably −120 to −400 mV. The reduction potential can be determined using a Fisher Scientific ACCUMET pH Meter 925. "ACCUMET" is a registered U.S. trademark.

The reduction is preferably effected in an inert atmosphere, e.g. under a nitrogen blanket, and at a temperature of about 30° to 60° C., especially 30° to 55° C.

Particularly good results are obtained when the reactants and reaction conditions are such that the sulfur dye is sufficiently reduced so that the resulting aqueous leuco dye solution has a yellow to amber color.

In general, when preparing a solution of a sulfur dye, sulfurized vat dye or complex thereof in a liquid ($a_1''$) or ($a_2''$) it is preferred to maintain the dye under an inert atmosphere during the various intermediate steps described above, at least to the stage where solid particles of the leuco dye are formed (where applicable), more preferably to the stage where a complex of the dye is formed (where applicable) and most preferably to the stage where the leuco dye or complex thereof has become dissolved in the liquid ($a_1''$) or ($a_2''$).

A solution of a salt of a solubilized sulfur dye (i.e. a water-soluble Bunte salt of a sulfur dye) in a liquid ($a_2''_b$) can be prepared by dissolving in such a liquid the water-insoluble product ("salt") of reacting a solubilized sulfur dye with a salt-forming agent in an aqueous medium. The dye salt-forming reaction can be carried out in the manner described in U.S. Pat. No. 4,941,923, the disclosure of which is incorporated herein by reference. In addition to the C.I. Solubilized Sulfur Black 1 disclosed therein, any other solubilized sulfur dye having a color suitable for copy-making purposes can be employed. The salt-forming agent must be one which can react with the solubilized sulfur dye to form an ($a_2''_b$)-soluble reaction product and is preferably a compound which, itself, is soluble in the liquid ($a_2''_b$). More preferably, it is a quaternary ammonium compound of formula (1) of U.S. Pat. No. 4,941,923 (which includes the compounds of formula (IV') above) having the last-mentioned characteristics. Instead of being dissolved in water as in the patent, the salt-forming agent may be dissolved in a water-miscible solvent, such as isopropyl alcohol, which is then mixed with the aqueous solution of the solubilized sulfur dye. Dissolution of the salt (i.e. the water-insoluble "pigment" of the patent) in the liquid ($a_2''_b$) can be effected by separating the precipitated salt from the aqueous medium, e.g. by filtration or centrifugation and decantation, with or without drying, and mixing the finely divided precipitate with the liquid ($a_2''_b$) or by mixing the aqueous medium containing the precipitated reaction product with a sufficient amount of a liquid ($a_2''_b$) to effect extraction of the reaction product from the aqueous phase into the liquid ($a_2''_b$), where it dissolves. Preferably, the salt-forming reaction and the dissolution of the salt in the liquid ($a_2''_b$) are effected at temperatures in the range 25° to 90°, more preferably 45° to 65° C. Enough of the solubilized sulfur dye and the salt-forming reactant should be used to produce a sufficient amount of ($a_2''_b$)-soluble reaction product to form a colored solution in the liquid ($a_2''_b$) suitable for copy-making purposes. Preferably, enough of said dye is used so that the solution of it in water also has a color suitable for copy-making purposes. Preferably, the proportion of salt-forming reactant to solubilized sulfur dye is such as to cause substantially all of the solubilized sulfur dye to precipitate from the aqueous solution. This amount can be predetermined for each combination of reactants by gradually adding the salt-forming reactant to an aliquot portion of the aqueous solubilized sulfur dye solution until a spot test on filter paper exudes no dye, (i.e. has a clear run-out).

A dispersion of a sulfur dye in an organic liquid (a) can be prepared by mixing solid leuco sulfur dye particles or an aqueous dispersion thereof with an organic liquid (a), particularly a liquid (a₂), which is a non-solvent for said particles, such as vegetable oil (e.g. soybean oil), and which contains an effective amount, e.g. 3 to 6%, by weight, of a surfactant, especially a cationic surfactant, such as a compound of formula (IV') above (e.g. N,N-dicoco-N,N-dimethylammonium chloride). When an aqueous dispersion of the leuco dye has been used, the resulting mixture is allowed to separate and the organic phase containing the dispersed dye is separated. The procedure is preferably carried out in an inert atmosphere until the dye is in the organic phase, whereupon the inert atmosphere atmosphere is removed to allow oxidation of the leuco dye to the desired depth of color.

Besides having the advantage of not requiring the presence of a color-developer component, the copy sheets of the present invention are also superior to carbon black-based copy systems by virtue of being bleachable (thus facilitating recycling of the paper substrate) and more resistant to smudging.

The invention will be illustrated by the following examples.

EXAMPLE 1 a) Preparation of Solubilized Sulfur Dye Solution in Monoisopropylbiphenyl (MIBP)

i) Four grams of the dye C.I. Solubilized Sulfur Black 2 are added to 36 g of water and heated to 50° C. To the resulting warm solution are added 5 ml of ADOGEN 462 from Witco Company, a mixture comprising 80% N,N-dicoco-N,N-dimethyl-ammonium chloride and 20% isopropyl alcohol ("ADOGEN" is a registered U.S. trademark.) A precipitate forms, which is filtered under vacuum and dried at room temperature and 3.3 g of the dry precipitate are dissolved in 30 ml of MIBP (TANACOL MPG from Sybron Chemicals, Inc.).

ii) Part (i) may be repeated substituting for the ADOGEN 462 1.3 to 2 parts, by weight of a mixture comprising 76.2%, by weight N,N-dicetyl-N,N-dimethylammonium chloride and 23.8%, by weight, isopropanol (ADOGEN 432) per part, by weight, of the dye. Similar products are obtained.

iii) Parts (i) and (ii) may be repeated substituting for the MIBP a sufficient amount of NEODOL 25 mixed $C_{12-15}$ fatty alcohols or partially hydrogenated terphenyl (HB-40 from Monsanto) or a mixture of 2 parts, by weight, MIBP and 1 part, by weight, HB-40 to produce 5 to 20% solutions of the respective dye salt in the solvent employed.

b) Microencapsulation

To a mixture of 45 ml of a 10% aqueous gelatin solution (275 Bloom), 45 ml of a 10% aqueous gum arabic solution and 30 ml of additional water, all of which liquids are preheated to 50° C. prior to mixing, is added sufficient 10% aqueous sodium hydroxide to adjust the pH to 6.64. To this solution are added 30 ml of the product of part (a)(i) at 50° C. and the resulting solution is homogenized with a Janke & Kunkel IKA homogenizer model Ultra Turrax T50, while the temperature continues to be maintained at 50° C., until the particle size of the droplets of the resulting emulsion is in the range 10 to 20 microns. While the resulting emulsion is maintained at 50° C., 170 ml of water are added thereto with stirring and the pH of the resulting mixture is lowered to 5.16 with glacial acetic acid. The resulting mixture is cooled to room temperature over a period of 3 hours and then stirred at room temperature for 16 hours. It is then cooled to 15° C. and 12 ml of a 7.8% aqueous solution of glutaric dialdehyde are added to the cooled mixture, which is maintained at 15° C. for 1 hour and then allowed to warm to room temperature over a period of 4 to 6 hours.

Similar products may be obtained starting with the products of parts (a)(ii) or (a)(iii).

c) Coating of Paper

One hundred twenty five milliliters of the microcapsule slurry produced according to part (b) is centrifuged at 1000 rpm for 30 minutes and 45 ml of the supernatant liquid is decanted off. To the concentrated slurry is added, with stirring, 6.5 g of KEESTAR 328 Starch (unmodified wheat starch/amylum) and 13 g of a 20% aqueous solution of PENFORD Gum 280 starch (hydroxyethyl starch ether; specific gravity 1.5–1.6). ("KEESTAR" and "PENFORD" are registered U.S. trademarks.) The resulting mixture is coated on 50 g/m² base paper using a #4 coating rod. After drying, the resulting sheet is smudge-resistant and produces a dark image when used as the top sheet of a pressure-sensitive copy system.

EXAMPLE 2 a) Preparation of Sulfur Dye Solution in MIBP

To 14.53 g of C.I. Sulfur Black 1 (68% solids, by weight) dispersed in 500 g of water are added 20 g of sodium hydroxide and the resulting mixture is heated to 50° C. under a nitrogen blanket. Twenty grams of thiourea dioxide are then added and heating is continued for 10 minutes. The resulting leuco sulfur dye solution is cooled to room temperature under nitrogen and the pH is lowered to 4 by addition of 18% strength hydrochloric acid, whereupon the leuco dye precipitates. The precipitate is separated from the aqueous liquor by centrifugation and decantation and there is added thereto 100 g of a mixture comprising monoisopropylbiphenyl and 20%, by weight, of ADOGEN 432 from Witco Corp., a mixture containing 76.2%, by weight, N,N-dicetyl-N,N-dimethylammonium chloride and 23.8%, by weight, isopropyl alcohol. The resulting mixture is heated at 50° C. under nitrogen for one hour to effect dissolution of the dye into the oil and is then removed from the nitrogen blanket to allow oxidation of the dye.

b) Microencapsulation

The procedure of part (b) of Example 1 is followed, except that 25 ml, instead of 30 ml, of additional water are added to the initial aqueous gelatin-gum arabic mixture and the pH is adjusted to 5.36 instead of 5.16 to effect coacervation. A similar slurry of microcapsules is obtained, which can be coated on paper as in part (c) of Example 1 to produce a pressure-sensitive copy sheet.

EXAMPLE 3 a) Solution of Solubilized Sulfur Dye in MIBP

A solution of 3.6 g of the dye C.I. Solubilized Sulfur Blue 7 in 50 g of water and a solution of 7.2 g of CARSOQUAT 868E (a mixture of 68% N,N-dicetyl-N,N-dimethylammonium chloride, 20% ethanol, 10& water and 1% methanol from Lonza) in 112.8 g of MIBP are mixed together and the mixture is stirred for 3 hours while heating at 50° C. ("CARSOQUAT" is a registered U.S. trademark.) The resulting mixture is cooled to room temperature and the oil and aqueous phases are allowed to separate. The oil phase, having dissolved therein the salt of the dye with the ammonium compound, is decanted off for use in part (b).

b) Microencapsulation

One gram of polyisocyanate (DDI 1410 from Henkel) is added to 20 ml of the solution produced in part (a) and the resulting mixture is heated to 55° C. and mixed with 80 ml of a 10% solution of gelatin (225 Bloom) in water which has been preheated to 60° C. The resulting mixture is vigorously agitated until an oil-in-water emulsion is formed in which the oil droplets are of a particle size in the range 5 to 10 microns. The emulsion is maintained at 60° C. with stirring for an additional two hours, at which point there is added 6 ml of a 10% solution of AIRVOL 107 (polyvinyl alcohol having a viscosity of 5.5–6.6 centipoises (as a 4% aqueous solution) and a percent hydrolysis in the range 98–98.8% from Air Products Corporation) in water. "AIRVOL" is a registered trademark. The resulting mixture is removed from the heat and applied to paper with a K-Coater before it has cooled to ambient temperature.

EXAMPLE 4 a) Encapsulation in Opaque Microcapsules i) Ten milliliters of a dye solution produced according to part (a) of Example 1 or Example 2, 10 ml of a 10% aqueous gelatin solution (275 Bloom), 10 ml of a 10% aqueous gum arabic solution and 5 ml of water are separately preheated to 50° C. and the gelatin and gum arabic solutions and water are mixed together. While the resulting mixture is maintained at 50° C., the pH is adjusted to 7 with sodium hydroxide and then the dye solution is added dropwise. The resulting mixture is stirred at 50° C. with sufficient shear and for a sufficient time that the droplets of the discontinuous phase of the resulting oil-in-water emulsion have particle sizes in the range 5 to 25 microns. While maintaining the temperature at 50° C., the pH of the resulting emulsion is raised to 8 with sodium hydroxide and a solution of 1.5 g of polyethylene glycol (MW 10000) in 38.5 g of water (preheated to 50° C.) is added dropwise. The pH of the resulting mixture is lowered to 6 by dropwise addition of glacial acetic acid and it is cooled to room temperature gradually by removing the source of heat.

ii) Twenty-five grams of titanium dioxide are dispersed in a sufficient amount of an aqueous solution containing, by weight, 2% gelatin (275 Bloom) and 1% Fancor ethoxylanolin (in accordance with the teaching of U.S. Pat. No. 4,808,408) at 50° C. to make 100 g of the resulting mixture. "FANCOR" is a registered trademark. This mixture is stirred with a four blade stainless steel mechanical stirrer at maximum speed for 30 minutes and then at lower speed until it is used in part (iii).

iii) Twenty milliliters of the TiO$_2$ dispersion prepared according to (ii) above are added to the emulsion of the dye solution from (i) above and the pH of the resulting mixture is lowered to 5 with glacial acetic acid. The resulting mixture is cooled to 15° C. and 1 ml of a 25% aqueous glutaric dialdehyde solution is added and the mixture is stirred overnight.

b) Preparation of Coating Composition

The product from (iii) above is centrifuged for 20 minutes at 2000 rpm, whereby the capsule slurry separates into a top layer of water, a middle layer rich in microcapsules and a bottom layer rich in TiO$_2$. The middle layer is separated from the other layers with a pipette and mixed with an equal volume of a 20% solution of AIRVOL 107 polyvinyl alcohol in water. Paper coated on its back side with such a composition produces good copies when used as the top sheet in a two-sheet pressure-sensitive copy system.

EXAMPLE 5 a) Preparation of Solution of Leuco Sulfurized Vat Dye in Water-Immiscible Liquid Six grams of C.I. Vat Black 63 presscake (95% solids) are dispersed in 267 g of water and to this dispersion are added 12 g of sodium hydroxide. The resulting mixture is heated to 30° C. under a nitrogen blanket, at which point 15 g of thiourea dioxide are added and heating at 30° C. is continued for one hour. The resulting leuco sulfurized vat dye solution is cooled to room temperature under nitrogen and the pH is lowered to 5.5 with glacial acetic acid, whereupon the leuco dye precipitates. The resulting slurry is centrifuged and the aqueous liquor is decanted off. To the solid residue are added 71 g of sorbitan trioleate (SPAN 85 from ICI) and the resulting mixture is heated at 50° C. overnight under a nitrogen blanket to bring about dissolution of the dye in the sorbitan trioleate.

b) Microencapsulation, Preparation of Coating and Coating of Paper

In a reaction vessel a mixture of 20 ml of a 9% solution of gelatin in water (275 Bloom), 20 ml of a 9% solution of gum arabic in water and 10 ml additional water (each of which has been preheated to 50° C.) is maintained at 50° C. and 20 ml of the solution from part (a) at 50° C. are gradually added thereto over a period of 5 minutes. The resulting is stirred with a paddle stirrer until the particle size of the droplets in the resulting oil-in-water emulsion is in the range 10 to 20 microns. While this emulsion is maintained at 50° C., 80 ml of water at 50° C. are added thereto with stirring. The pH of the resulting mixture is lowered to 4.8 with glacial acetic acid and it is then cooled to 10° C. over a period of 3.5 hours, whereupon 2.5 ml of a 25% aqueous glutaric dialdehyde solution are added thereto. The resulting mixture is then allowed to warm to room temperature over a period of 4 to 6 hours. The foregoing steps are carried out under a nitrogen blanket, which is removed at this point to allow the microencapsulated dye to become oxidized. The resulting aqueous dispersion of microcapsules, after being concentrated as in Example 1, is mixed with an equal amount, by weight, of a 15% aqueous solution of AIRVOL 107 polyvinyl alcohol and the resulting mixture is coated on one side of a sheet of paper using a #4 coating rod. After drying, the resulting sheet is useful as the coated-back top sheet of a pressure-sensitive copy system.

EXAMPLE 6 a) Preparation of Sulfur Dye Dispersion in Soybean Oil

To 4 g of C.I. Sulfur Black 1 dye (68% solids, by weight) dispersed in 192 g of water are added 2 g of sodium hydroxide and the resulting mixture is heated to 53° C. under a nitrogen blanket. Two grams of thiourea dioxide are then added and heating is continued for 10 minutes. The resulting leuco sulfur dye solution is cooled to room temperature under nitrogen and the pH is lowered to 4.1 by addition of glacial acetic acid, whereupon the leuco dye precipitates. To the resulting dispersion is added, dropwise, a mixture of 41 g of soybean oil and 3 g of ADOGEN 462, while stirring and heating to 50° C. under nitrogen. Heating is continued for 30 minutes and then the mixture is cooled to room temperature. The nitrogen blanket is removed, allowing for oxidation of the leuco sulfur dye, and the soybean oil layer containing the sulfur dye dispersed therein is separated from the aqueous layer.

b) Microencapsulation

The procedure according to part (b) of Example 1 is repeated, except that the starting gelatin-gum arabic mixture comprises 30 ml each of the 10% gelatin and gum arabic solutions and 20 ml of additional water and the pH is adjusted to 5.37, instead of 5.16.

We claim:

1. A composition comprising microcapsules which contain a water-immiscible organic liquid ($a_2$), said liquid ($a_2$) containing a colorant and being chemically inert with respect to the colorant and a non-solvent for the material which comprises the microcapsules and having a vapor pressure below 20 mm of mercury at 25° C. and a viscosity such as to permit it to seep freely from a microcapsule when ruptured.

2. A composition according to claim 1 wherein the microcapsules are pressure-sensitive.

3. A composition comprising microcapsules which contain an organic liquid (a) in which there is dissolved or dispersed a colorant which is an oil-solubilized sulfur dye selected from the group consisting of a colored product of oxidizing a leuco sulfur dye, a colored product of oxidizing a leuco sulfurized vat dye, a colored product of oxidizing a complex formed by reacting a leuco sulfur dye with a cationizing compound, a colored product of oxidizing a complex formed by reacting a leuco sulfurized vat dye with a cationizing compound, a colored complex formed by reacting a colored leuco sulfur with a cationizing compound, a colored complex formed by reacting a colored leuco sulfurized vat dye with a cationizing compound, and a colored water-insoluble salt of a solubilized sulfur dye and a cationic compound, said liquid (a) being chemically inert with respect to the colorant and a non-solvent for the material which comprises the microcapsules and having a vapor pressure below 20 mm of mercury at 25° C. and a viscosity such as to permit it to seep freely from a microcapsule when ruptured.

4. A composition according to claim 3 wherein the colorant is a colored product of oxidizing a leuco sulfur dye, leuco sulfurized vat dye or complex formed by reacting a leuco sulfur dye or leuco sulfurized vat dye with a cationizing compound or a colored water-insoluble salt of a solubilized sulfur dye and a cationic compound.

5. A composition according to claim 3 wherein the colorant is dissolved in the organic liquid (a).

6. A composition according to claim 5 wherein the colorant is a colored product of oxidizing a leuco sulfur dye or leuco sulfurized vat dye and the organic liquid (a) is a water-miscible organic liquid ($a_1''$) in which the colorant is soluble.

7. A composition according to claim 6 wherein the liquid ($a_1''$) is selected from the group consisting of glycerol, ethylene glycol, propylene glycol, diethylene glycol, triethylene glycol, polyethylene glycol of molecular weight up to about 600 and mixtures thereof with water.

8. A composition according to claim 7 wherein the liquid ($a_1''$) has a vapor pressure below 15 mm Hg at 25° C.

9. A composition according to claim 5 wherein the colorant is a colored product of oxidizing a leuco sulfur dye or leuco sulfurized vat dye and the organic liquid (a) is a water-immiscible organic liquid ($a_2''_a$) which is a solvent for the leuco dye and for the product of oxidizing the leuco dye.

10. A composition according to claim 9 wherein the organic liquid ($a_2''_a$) is selected from the group consisting of alkoxylated alcohols, sorbitan esters, alkoxylated alkylphenols, polypropylene glycols of molecular weight 1200 to 4000, polyoxypropylene-polyoxyethylene block copolymers and mixtures of vegetable oils with modified triglycerides.

11. A composition according to claim 10 wherein the alkoxylated alcohols are selected from $C_{9-15}$ linear primary alcohols ethoxylated with 1 to 8 mols of ethylene oxide per mol of alcohol, the sorbitan esters are selected from mono-, di- and triesters of sorbitol with $C_{14-20}$ carboxylic acids, and the alkoxylated alkylphenols are selected from mono-, di- and tri-($C_{6-12}$ alkyl)phenols ethoxylated with 3 to 7 mols of ethylene oxide.

12. A composition according to claim 11 wherein the organic liquid ($a_2''_a$) is selected from the group consisting of mixed $C_{9-11}$ alcohols containing 2.5 ethylene oxide groups, $C_{11}$ alcohol containing 3 ethylene oxide groups, mixed $C_{12-13}$ alcohols containing 1 or 3 ethylene oxide groups, mixed $C_{12-15}$ alcohols containing 3 ethylene oxide groups, sorbitan trioleate, nonylphenol ethoxylated with an average of 4 mols of ethylene oxide, propylene oxide-ethylene oxide block copolymers of molecular weight 2000, soybean oil in admixture with coconut oil modified with 10%, by weight, tetrakis [methylene (3,5-di-tert.-butyl-4-hydroxyhydrocinnamate)] methane and polypropylene glycol of molecular weight 1200.

13. A composition according to claim 5 wherein the colorant is a colored product of oxidizing a complex formed by reacting a leuco sulfur dye or leuco sulfurized vat dye with a cationizing compound or it is a colored complex formed by reacting a colored leuco sulfur dye or colored leuco sulfurized vat dye with a cationizing compound and the organic liquid (a) is a water-immiscible organic liquid ($a_2''_b$) which is a solvent for the colorant.

14. A composition according to claim 13 wherein the organic liquid ($a_2''_b$) is selected from the group consisting of alkylbiphenyls containing 1 to 2 $C_{3-4}$ alkyl groups, partially hydrogenated terphenyls, mixtures of partially hydrogenated terphenyls with up to 50%, based on the total weight, of unsubstituted or substituted naphthalene, partially hydrogenated terphenyls containing partially hydrogenated quaterphenyls, mixtures of monoisopropylbiphenyl with partially hydrogenated terphenyls containing partially hydrogenated quaterphenyls or with up to 50%, based on total weight, of one or more alkylnaphthalenes, and mixtures of partially hydrogenated terphenyls containing partially hydrogenated quaterphenyls with up to 50%, based on total weight, of one or more alkylnaphthalenes.

15. A composition according to claim 14 wherein any substituted naphthalene is an alkylnaphthalene containing 1 or 2 $C_{3-4}$ alkyl groups.

16. A composition according to claim 14 wherein the cationizing compound is a compound of formula (III') or (IV')

or

-continued

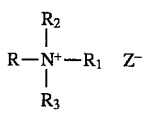   (IV')

wherein

R signifies an aliphatic hydrocarbon radical with 8–24 carbon atoms, $R_1$ signifies $C_{1-4}$ alkyl, $R_2$ signifies $C_{1-24}$ alkyl, $C_{3-24}$ alkenyl or benzyl, $R_3$ signifies $C_{1-4}$ alkyl and $Z^-$ signifies an anion, provided that for each compound the specific significances of R, $R_1$, $R_2$ and $R_3$ are such that the compound will form with a leuco sulfur dye a reaction product which is soluble in a liquid $(a_2"_b)$.

17. A composition according to claim 16 wherein the compound of formula (IV') is N,N,N-trimethyl-N-nonyl ammonium bromide, N,N-dicetyl-N,N-dimethylammonium chloride or N,N-dicoco-N,N-dimethylammonium chloride.

18. A composition according to claim 13 wherein the cationizing compound is a compound of formula (III') or (IV')

   (III')

or

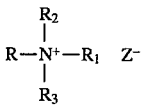   (IV')

wherein

R signifies an aliphatic hydrocarbon radical with 8–24 carbon atoms, $R_1$ signifies $C_{1-4}$ alkyl, $R_2$ signifies $C_{1-24}$ alkyl, $C_{3-24}$ alkenyl or benzyl, $R_3$ signifies $C_{1-4}$ alkyl and $Z^-$ signifies an anion, provided that for each compound the specific significances of R, $R_1$, $R_2$ and $R_3$ are such that the compound will form with a leuco sulfur dye a reaction product which is soluble in a liquid $(a_2"_b)$.

19. A composition according to claim 13 wherein the colorant is a colored product of oxidizing a complex formed by reacting a leuco sulfur dye or leuco sulfurized vat dye with a cationizing compound.

20. A composition according to claim 5 wherein the colorant is a water-insoluble salt of a solubilized sulfur dye and the organic liquid (a) is a water-immiscible organic liquid $(a_2"_b)$ which is a solvent for the colorant.

21. A composition according to claim 20 wherein the organic liquid $(a_2"_b)$ is selected from the group consisting of alkylbiphenyls containing 1 to 2 $C_{3-4}$ alkyl groups, partially hydrogenated terphenyls, mixtures of partially hydrogenated terphenyls with up to 50%, based on the total weight, of unsubstituted or substituted naphthalene, partially hydrogenated terphenyls containing partially hydrogenated quaterphenyls, mixtures of monoisopropylbiphenyl with partially hydrogenated terphenyls containing partially hydrogenated quaterphenyls or with up to 50%, based on total weight, of one or more alkylnaphthalenes, and mixtures of partially hydrogenated terphenyls containing partially hydrogenated quaterphenyls with up to 50%, based on total weight, of one or more alkylnaphthalenes.

22. A composition according to claim 21 wherein the cationic compound is a compound which can react with the solubilized sulfur dye to form an $(a_2"_b)$-soluble reaction product and which is of the formula

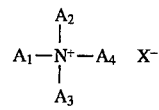

wherein $A_1$, $A_2$, $A_3$ and $R_4$ are alkyl or phenyl and $X^-$ is an anion.

23. A composition according to claim 20 wherein the cationic compound is a compound which can react with the solubilized sulfur dye to form an $(a_2"_b)$-soluble reaction product and which is of the formula

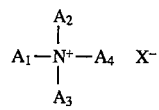

wherein $A_1$, $A_2$, $A_3$ and $R_4$ are alkyl or phenyl and $X^-$ is an anion.

24. A composition according to claim 4 wherein the colorant is prepared from C.I. Sulfur Black 1, C.I. Vat Black 63, C.I. Solubilized Sulfur Blue 7 or C.I. Solubilized Sulfur Black 2.

25. A composition according to claim 5 wherein the concentration of the colorant in the organic liquid (a) is in the range from about 0.2 to about 18%, based on the total weight of the solution.

26. A composition according to claim 3 wherein the cationizing compound and the cationic compound are soluble in the organic liquid (a).

27. A composition according to claim 4 wherein the organic liquid (a) is one in which the oil-solubilized sulfur dye is soluble.

28. A composition according to claim 3 wherein the organic liquid (a) consists of a single organic liquid or comprises a mixture of organic liquids or a mixture of water and one or more organic liquids.

29. A composition according to claim 3 wherein the organic liquid (a) has a vapor pressure of 0.01 to 10 mm Hg at 25° C.

30. A composition according to claim 3 wherein the organic liquid (a) is a water-miscible liquid $(a_1)$.

31. A composition according to claim 3 wherein the organic liquid (a) is a water-immiscible liquid $(a_2)$.

32. A composition according to claim 3 wherein the walls of the microcapsules contain an opacifying agent.

33. A composition according to claim 3 wherein the colorant is dispersed in the organic liquid (a).

* * * * *